Aug. 1, 1933.  G. R. PAYNE  1,920,589
RING CUP FOR FICTILE PIPES
Filed Oct. 10, 1932

G. R. Payne Inventor

By C. A. Snow & Co.
Attorneys.

Patented Aug. 1, 1933

1,920,589

UNITED STATES PATENT OFFICE 1,920,589

RING CUP FOR FICTILE PIPES

George Ralph Payne, Texarkana, Ark.

Application October 10, 1932. Serial No. 637,165

4 Claims. (Cl. 34—16)

This invention aims to provide a novel means for keeping the spigot end of a clay sewer pipe, or other pipe, in shape, whilst the pipe is green and being dried.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
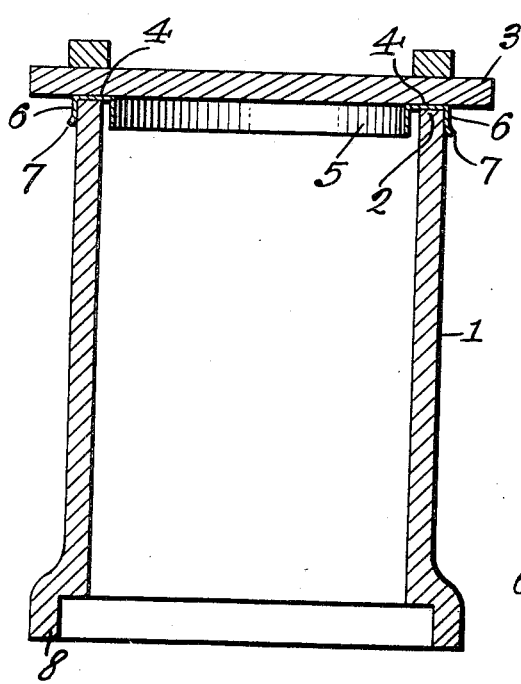
Fig. 1 shows in vertical longitudinal section, a sewer pipe as it comes from the press, the device forming the subject matter of this application being mounted thereon.
Figure 2:
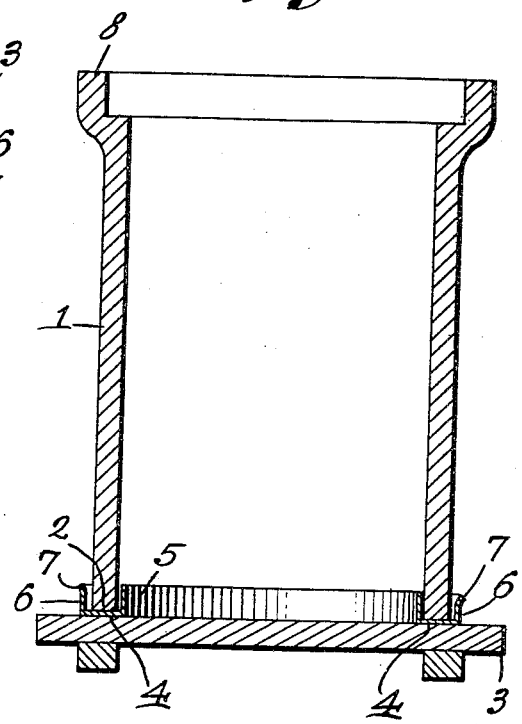
Fig. 2 is a vertical longitudinal section showing the pipe, with the invention thereon, after the pipe has been inverted.
Figure 3:
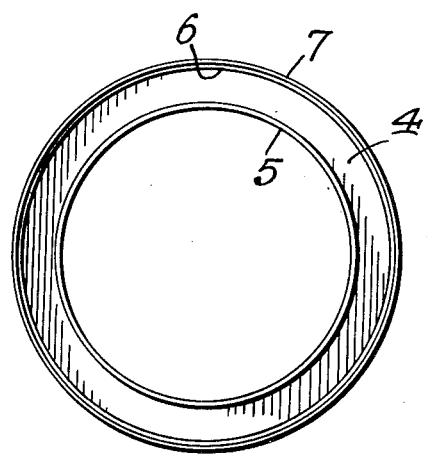
Fig. 3 is a top plan of the device which forms the subject matter of this application.

Disregarding completely, for the moment, the device hereinafter described and claimed, it may be stated that according to the present practice, the pipe 1 comes from the press, with the spigot end 2 uppermost, as shown in Fig. 1. A wooden pallet 3 is placed over the spigot end of the pipe 1, the spigot end being the upper end. The pipe 1 then is turned end for end, to the position of Fig. 2, with the pipe resting on the pallet 3, and the composite article, comprising the pipe and the pallet, in the position of Fig. 2, is trucked to the drying room.

The tempered clay, from which the pipe 1 is made, contains 20% or more of water, and, hence, in drying, the ware is subjected to considerable shrinkage, in some clays as much as one-half inch or more per foot of diameter. In trucking the green pipe 1 from the press to the drying room, in the position of Fig. 2, but with the spigot end 2 of the pipe 1 in direct contact with the pallet 3, there is more or less distortion of the spigot end 2, due to the jolting in transit, and to the jar from starting and stopping the truck. Hence, when the drying process is started, the spigot end 2 is somewhat out-of-round, or, in other words, is not a true circle, as it was when issued from the press. In drying, there are factors that tend to produce further distortion. For example, the pipe 1 may not have an even bearing on the wooden pallet 3, due to an inclination in the floor of the drying room, or to the irregularities in the pallet. Therefore, the pipe will take its greatest shrinkage at the places having the lightest bearing or least perfect support on the pallet, the greatest freedom of movement for shrinkage being at those places. Moreover, the pipe 1, in shrinking, will creep more readily with the grain of the wood of the pallet 3 than counter to the grain of the wood, and this is another cause of distortion in the spigot end 2 on the pipe 1.

In carrying out the invention, there is provided a metal ring-cup, including a flat base 4 having an inner annular wall 5, and an outer annular wall 6, both of these walls being disposed approximately at right angles to the base 4. The outer wall 6 is of such diameter that it fits snugly around the outside of the spigot end 2 of a green or freshly pressed pipe 1, as shown in Fig. 1. The inner wall 5 is slightly less in diameter than the inside diameter of the spigot end 2 of the pipe 1, after the pipe has dried, as is indicated in Fig. 2, the pipe can contract freely about its entire circumference, and the contraction is uniform in the vast majority of cases, when the device forming the subject-matter of this application is used. It would be idle, however, to state that no pipe ever will contract unevenly. Occasionally, a pipe will contract unevenly, no matter what precautions are taken. This may occur due to lack of homogeneity in the mixture, abnormal conditions in the drying room, and other causes. Should the spigot end 2 of the pipe 1 shrink more rapidly at one point than at another, it will, at the place of most rapid shrinkage, encounter the inner wall 5, and thereafter, the creeping and shrinking will take place in other portions of the spigot end 2 of the pipe until, ultimately, the spigot end of the pipe shrinks to a true circle, about the inner wall 5, and is capable of being inserted into the bell end 8 of a similar pipe.

In practical operation, the upper or inside surface of the base 4 of the ring-cup is oiled, and the ring-cup is slipped over the spigot end 2 of the pipe 1, when the spigot end of the pipe is uppermost, and as the pipe is being removed from the press. The wooden pallet 3 is placed on top of the ring-cup. The pipe 1 and the pallet 3, along with the ring-cup, are inverted to the position of Fig. 2, and the composite structure is trundled to the drying room, on the truck.

Among the many advantages of the invention, the following may be referred to:

The outer wall 6 clasps the spigot end 2 of the green pipe 1, and holds it true round, and in shape, whilst the pipe is being trucked to the drying room.

The inner or upper surface of the base 4 of the ring-cup, being smooth, permits the pipe 1, as the pipe shrinks during drying, to creep freely, without binding or causing unreasonable friction at any point. Therefore, there is, in practice, a marked decrease in uneven shrinkage, and no uneven shrinkage at all that can be attributed to the device forming the subject matter of this application. Generally stated, the cup-ring herein shown produces a pipe of truly circular form at its spigot end.

The spigot end 2 of the pipe 1 is protected by the walls 5 and 6 of the ring-cup, and the drying at the extreme end of the pipe is slightly retarded, over what would be the case if the spigot end of the pipe were exposed, it being a matter of common knowledge that the spigot end of a pipe dries more rapidly than the body of the pipe. The device, therefore, prevents uneven strains in the pipe, due to characteristically rapid drying at the spigot end 2.

In order to guide the spigot end 2 of the pipe 1 into the ring-cup, the outer wall 6 of the ring-cup is provided at its upper end with a continuous, circumferential, outwardly inclined lip 7.

Having thus described the invention, what is claimed is:

1. A device for receiving the end of a fictile pipe, during drying, comprising a channel-shaped ring-cup including a base and inner and outer walls, the diameter of the outer wall being such that it will embrace the end of a green pipe closely, and the diameter of the inner wall being less than the diameter of the pipe, after the pipe has dried.

2. The combination with a wooden pallet for supporting a fictile pipe on end whilst the pipe is drying, of an impervious metal ring-cup including a base interposed between the pallet and said end of the pipe, an outer circular wall of such diameter as to embrace said end of the pipe closely whilst the pipe is green and uncontracted, and an inner circular wall which cooperates with the outer wall to shield said end of the pipe and prevent too rapid drying thereof, the inner wall being of such diameter that said end of the pipe can dry and contract to the maximum without touching the inner wall.

3. The combination with a wooden pallet for supporting a fictile pipe on end whilst the pipe is drying, of an impervious metal ring-cup including a base interposed between the pallet and said end of the pipe, an outer circular wall of such diameter as to embrace said end of the pipe closely whilst the pipe is green and uncontracted, and an inner circular wall which cooperates with the outer wall to shield said end of the pipe and prevent too rapid drying thereof, the inner wall being small enough in diameter so that when said end of the pipe shrinks normally, such normal shrinkage and the consequent contraction can take place to the maximum without bringing said end of the pipe into contact with the inner wall, the inner wall being large enough in diameter so that when abnormal shrinkage and contraction occur, said end of the pipe can embrace the inner wall closely and be constrained thereby to assume the peripheral contour of the inner wall.

4. A device for receiving the end of a fictile pipe, during drying, comprising a channel-shaped ring-cup including a base, an outer circular wall of such diameter as to embrace said end of the pipe closely whilst the pipe is green and uncontracted, and an inner circular wall which cooperates with the outer wall to shield said end of the pipe and prevent too rapid drying thereof, the inner wall being small enough in diameter so that when said end of the pipe shrinks normally, such normal shrinkage and the consequent contraction can take place to the maximum without bringing said end of the pipe into contact with the inner wall, the inner wall being large enough in diameter so that when abnormal shrinkage and contraction occur, said end of the pipe can embrace the inner wall closely and be constrained thereby to assume the peripheral contour of the inner wall.

GEORGE RALPH PAYNE.